US008957182B2

(12) United States Patent
Lee et al.

(10) Patent No.: US 8,957,182 B2
(45) Date of Patent: *Feb. 17, 2015

(54) POLYARYLENE SULFIDE RESIN WITH EXCELLENT LUMINOSITY AND PREPARATION METHOD THEREOF

(71) Applicant: SK Chemicals Co., Ltd., Suwon (KR)

(72) Inventors: Young-Rok Lee, Seoul (KR); Il-Hoon Cha, Anyang (KR); Yong-Jun Shin, Seoul (KR); Jun-Sang Cho, Yongin-Shi (KR)

(73) Assignee: SK Chemicals Co., Ltd., Suwon (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/179,909

(22) Filed: Feb. 13, 2014

(65) Prior Publication Data

US 2014/0194592 A1  Jul. 10, 2014

Related U.S. Application Data

(63) Continuation of application No. 12/518,369, filed as application No. PCT/KR2008/000049 on Jan. 4, 2008.

(30) Foreign Application Priority Data

Jan. 4, 2007 (KR) .................. 10-2007-0000966

(51) Int. Cl.
C08G 75/14 (2006.01)
C08G 75/02 (2006.01)
C08L 81/02 (2006.01)

(52) U.S. Cl.
CPC ............ *C08G 75/14* (2013.01); *C08G 75/0209* (2013.01); *C08G 75/0231* (2013.01); *C08G 75/0263* (2013.01); *C08L 81/02* (2013.01)
USPC ............................ 528/389; 528/373; 528/388

(58) Field of Classification Search
USPC ......................................... 528/389, 388, 373
See application file for complete search history.

(56) References Cited

U.S. PATENT DOCUMENTS

| 2,513,188 A | 6/1950 | McCallum |
| 2,538,941 A | 1/1951 | Macallum |
| 3,285,882 A | 11/1966 | Pike |
| 3,395,132 A | 7/1968 | Smith |
| 3,699,087 A | 10/1972 | Brown et al. |
| 3,878,176 A | 4/1975 | Moberly |
| 3,919,177 A | 11/1975 | Campbell |
| 4,046,749 A | 9/1977 | Hawkins |
| 4,178,433 A | 12/1979 | Smith |
| 4,585,856 A * | 4/1986 | Ebert et al. .................... 528/388 |
| 4,605,733 A | 8/1986 | Senatore |
| 4,690,972 A | 9/1987 | Johnson et al. |
| 4,760,128 A | 7/1988 | Ebert et al. |
| 4,786,713 A | 11/1988 | Rule et al. |
| 4,792,600 A | 12/1988 | Rule et al. |
| 4,792,634 A | 12/1988 | Rule |
| 4,855,393 A | 8/1989 | Rule et al. |
| 4,945,155 A | 7/1990 | Fagerburg et al. |
| 4,952,671 A * | 8/1990 | Fagerburg et al. ............ 528/226 |
| 5,654,383 A | 8/1997 | Kohler et al. |
| 5,945,490 A | 8/1999 | Tsuda et al. |
| 6,531,981 B1 | 3/2003 | Fuller et al. |
| 2005/0151683 A1 | 7/2005 | Sharpe et al. |
| 2006/0122363 A1 | 6/2006 | Hayashi et al. |
| 2009/0203872 A1* | 8/2009 | Lee et al. ...................... 528/373 |

FOREIGN PATENT DOCUMENTS

| DE | 3030488 A1 | 3/1981 |
| DE | 3507827 A1 | 9/1986 |
| EP | 0079144 A1 | 5/1983 |
| EP | 164639 A2 | 12/1985 |
| EP | 0193951 A2 | 9/1986 |
| EP | 0214470 A1 | 3/1987 |
| EP | 0238193 A1 | 9/1987 |
| EP | 0259188 A2 | 3/1988 |
| EP | 0316078 A2 | 5/1989 |
| EP | 355541 A2 | 2/1990 |
| EP | 1580570 A3 | 9/2006 |
| FR | 1583819 A | 12/1969 |
| JP | 1961255933 | 11/1986 |
| JP | 1963159435 | 2/1988 |
| JP | 196241225 A | 8/1994 |
| JP | 2002194054 A | 7/2002 |
| JP | 2004500086 A | 1/2004 |

(Continued)

OTHER PUBLICATIONS

Fujii et al., JP 2001123062, 2001.*

(Continued)

*Primary Examiner* — Shane Fang
(74) *Attorney, Agent, or Firm* — Gifford, Krass, Sprinkle, Anderson & Citkowski, P.C.

(57) ABSTRACT

The present invention relates to a polyarylene sulfide that is prepared from a composition including 100 parts by weight of solid sulfur, 500 to 10,000 parts by weight of iodinated aryl compounds, and 0.03 to 30 parts by weight of a sulfur-containing polymerization terminator with respect to 100 parts by weight of the solid sulfur, and has a melting temperature (Tm) of 255 to 285° C., and luminosity of 40 or higher as defined by the CIE Lab color model, and a process of preparing the same. The PAS resin is prepared from a composition including a sulfur-containing polymerization terminator and thus has excellent thermal properties and luminosity.

2 Claims, No Drawings

(56) References Cited

FOREIGN PATENT DOCUMENTS

| | | | |
|---|---|---|---|
| JP | 2003500901 B2 | 2/2004 | |
| JP | 2003502463 B2 | 3/2004 | |
| JP | 2003502586 B2 | 3/2004 | |
| JP | 2003504391 B2 | 3/2004 | |
| JP | 2003506047 B2 | 3/2004 | |
| JP | 2004285093 A | 10/2004 | |
| JP | 2005501732 A | 1/2005 | |
| JP | 2009138206 A | 6/2009 | |
| JP | 2009525491 A | 7/2009 | |
| JP | 2009286861 | 12/2009 | |
| JP | 2010501161 A1 | 1/2010 | |
| JP | 2010501661 A | 1/2010 | |
| JP | 2010515781 | 5/2010 | |
| JP | 2004500825 B2 | 7/2010 | |
| JP | 2004503967 B2 | 7/2010 | |
| JP | 2004506228 B2 | 7/2010 | |
| WO | 8903850 A1 | 5/1989 | |
| WO | 8904338 A1 | 5/1989 | |
| WO | 8905324 A3 | 7/1989 | |
| WO | 8908674 A1 | 9/1989 | |
| WO | 8911498 A1 | 11/1989 | |
| WO | 9000575 A1 | 1/1990 | |
| WO | 9001049 A1 | 2/1990 | |
| WO | 9010664 A1 | 9/1990 | |
| WO | 9015837 A1 | 12/1990 | |
| WO | 9108249 A2 | 6/1991 | |
| WO | 2004060973 A1 | 7/2004 | |
| WO | 2008023915 A1 | 2/2008 | |
| WO | 2008082265 A1 | 7/2008 | |
| WO | 2007089767 A8 | 10/2008 | |

OTHER PUBLICATIONS

Hortling, B. and Lindberg, J.J. (1978), The formation of poly(phenylene sulfide)s and the substituent effect in reactions of substituted chlorobenzenes with sulfur. Makromol. Chem., 179: 1707-1718. doi: 10.1002/macp.1978.021790706.

Crawford S. et al., Performance Evaluation of Sensor Combinations on Mobile Robots for Automated Platoon Control, ION GNSS 2004 Conference, Long Beach, CA: 706-717, Sep. 21-24, 2004.

Fujii, Y., et al., JP 2001 123062, May 2001.

K. Kodera, et al., Preparation of Crosslinked Polyarylene Sulphide Polymer from Alkali Metal Sulphide and Poly: Halide Compound in Polar Organic Solvent, Chemical Patents Index, Basic Abstracts Journal, Section A: Plasdoc, week 8736, Nov. 4, 1987, abstract No. 87-254682/36, Derwent Publications Ltd (London, GB), & JP, A, 62177027 (Dainippon Ink & Chem Inc.) Aug. 3, 1987, see abstract.

* cited by examiner

POLYARYLENE SULFIDE RESIN WITH EXCELLENT LUMINOSITY AND PREPARATION METHOD THEREOF

CROSS-REFERENCE TO RELATED APPLICATIONS

This application is a Continuation application of U.S. application Ser. No. 12/518,369, filed on Jun. 9, 2009, which in turn is the U.S. national phase of PCT/KR2008/000049 filed Jan. 4, 2008, which claims priority of Korean Patent Application No. 10-2007-0000966 filed Jan. 4, 2007, all of which are incorporated herein in their entirety by reference.

FIELD OF THE INVENTION

The present invention relates to a method of producing polyarylene sulfide (PAS) and PAS resin produced therefrom, and more specifically, to a method of producing PAS resin with better thermal properties and luminosity than conventional PAS and the PAS resin produced therefrom.

BACKGROUND OF THE INVENTION

PAS resin is one of representative engineering plastics, and has excellent physical properties such as heat resistance, chemicals resistance, flame resistance, and electrical insulating properties. PAS resin can be widely used for computer accessories, automobile accessories, coatings for parts contacting corrosive chemicals, and industrial fibers with chemical resistance. At present, only polyphenylene sulfide of PAS resins is commercially available.

The representative method of preparing PPS resin is a Macullum process, in which PPS resin is synthesized by polymerizing an aromatic dichloride compound and sulfides in a polar organic solvent and described in U.S. Pat. Nos. 2,513,188 and 2,583,941.

(Macullum process)

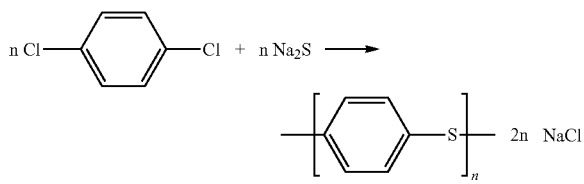

As seen from the reaction scheme, p-dichlorobenzene and sodium sulfide are polymerized in a polar organic solvent such as N-methyl pyrrolidone to produce PPS resin and NaCl as a by-product.

The PPS resin synthesized in the Macullum process has a narrow range of application due to a molecular weight of 10,000 to 40,000 and melt viscosity of 3000 Poise or lower, resulting in narrow applications and it cannot be applied with post-treatment. That is, to improve the melt viscosity of PPS resin, the synthesized PPS resin is further cured at a temperature of lower than the melting temperature (Tm) of PPS resin. The melt viscosity of PPS resin oxidation increases due to oxidation, crosslinking, and polymer chain extension in the curing step.

However, disadvantages of the Macullum process are as follows. First, the use of sulfides such as sodium sulfide produces a large amount of a by-product (metal salt). In the case of using sodium sulfide, the amount of produced by-product is 52 weight % with respect to the weight of the starting material, thereby resulting in difficulty in treating the by-product and a low yield of PPS resin. In addition, the by-product remains in PPS resin at several ppm to several thousands of ppm, and increases electrical conductivity, causes corrosion of machines, and problems in spinning fiber. Second, the Macullum process adopts a solution polymerization method, and thus produces PPS resin in a very fine powder form with a low apparent density, thereby causing disadvantages in transportation and manufacturing processes. Third, the brittleness of PPS resin increases in a curing process for improving the melt viscosity of PPS resin, and thus lowers the mechanical properties such as impact strength and causes the color of PPS to be dark.

There have been many suggestions to resolve such problems, and these include a composition and method for preparing PPS resin described in U.S. Pat. Nos. 4,746,758 and 4,786,713. In the composition and method, diiodo-aryl compounds and solid sulfur instead of dichloride compounds and sulfides are polymerized by being directly heated in the absence of a polar organic solvent.

The preparation method includes an iodination and polymerization step. The aryl compounds are reacted with iodine to obtain diiodo-aryl compounds in the iodination step, followed by polymerization of the diiodo-aryl compounds with solid sulfur over a nitro compound catalyst to produce PAS resin. Iodine generated in gas formed in the process is recovered and reused for the iodination process. The iodine is substantially a catalyst.

The method can resolve the problems of the conventional Macullum process. That is, because iodine is the by-product of the process and can be easily recovered, the electrical conductivity is not increased and the amount of iodine remaining in the final product is very low, and waste is reduced due to reuse of the recovered iodine. In addition, since an organic solvent is not used in the polymerization process, the final resin can be obtained in a pellet form, thereby avoiding the problems of the fine powder.

The PAS resin obtained in the process has a higher molecular weight than that of the Macullum process, and thus needs not be cured.

However, the composition and method for preparing PAS resin has some problems as follows. First, because residual iodine molecules are corrosive, even a small amount of iodine remaining in the final PAS resin can cause problems in manufacturing machines, and the dark color of iodine makes the resultant PAS resin dark. Second, as solid sulfur is used in the polymerization process, disulfide bonds included in PAS resin deteriorate the thermal properties of the resin. Third, not using the nitro compound catalyst makes the resin light, but deteriorates the thermal properties compared to when using a catalyst due to an increase in the disulfide bond content.

SUMMARY OF THE INVENTION

To resolve the problems of the conventional technique, an object of the present invention is to provide a polyarylene sulfide with improved thermal properties and color (luminosity).

Another object of the present invention is to provide a process of preparing the PAS resin.

A further object of the present invention is to provide resin articles manufactured from the polyarylene sulfide resin such as molded articles, films, sheets, or fibers.

DETAILED DESCRIPTION OF THE PREFERRED EMBODIMENTS

These and other objects of the invention will be more fully understood from the following description of the invention, the referenced drawings attached hereto, and the claims appended hereto.

The present invention relates to a polyarylene sulfide that is prepared from a composition comprising 100 parts by weight of solid sulfur, 500 to 10,000 parts by weight of iodinated aryl compounds, and 0.03 to 30 parts by weight of a sulfur-containing polymerization terminator, with respect to 100 parts by weight of the solid sulfur, and has a melting temperature (Tm) of 255 to 285° C. and luminosity of 40 or higher as defined by the CIE Lab color model.

In addition, the present invention provides a process of preparing the polyarylene sulfide, including the steps of:

a) melting and mixing a composition including 100 parts by weight of the solid sulfur, 500 to 10,000 parts by weight of the iodinated aryl compounds, and 0.03 to 30 parts by weight of the sulfur-containing polymerization terminator, with respect to 100 parts by weight of the solid sulfur; and b) polymerizing the molten mixture of step a) for 1 to 30 hours while increasing the temperature and decreasing the pressure from initial reaction conditions of a temperature 180 to 250° C. and a pressure 50 to 450 Torr to final reaction conditions of a temperature 270 to 350° C. and a pressure 0.001 to 20 Torr.

The present invention will now be described in more detailed.

While studying an improvement method of luminosity or color of PAS resin, the present inventors found that in the process of preparing the PAS resin starting from solid sulfur and iodinated aryl compounds, the nitro compound as a polymerization catalyst was a primary cause of darkening the color of PAS resin, and thus a suitable catalyst and additives were designed and added to a composition for PAS resin, thereby resulting in achieving an improvement in luminosity as defined by the CIE Lab color model while minimizing a decrease of other properties of PAS resin.

In the present invention, the PAS resin is prepared from a composition including solid sulfur, iodinated aryl compounds, and a sulfur-containing polymerization terminator.

The sulfur compounds and iodinated aryl compounds used in step a) are not particularly limited, and can be compounds that can be selected and used by the skilled person in the art.

Preferably, sulfur (S) exits cyclooctasulfur (S8) at room temperature, and the sulfur compounds can be any sulfur compound as long as it is in solid or liquid form at room temperature.

The iodinated aryl compounds include at least one selected from diiodobenzene (DIB), diiodonaphthalene, diiodobiphenyl, diiodobisphenol, and diiodobenzophenone. The derivatives of iodinated aryl compounds are also used by linking an alkyl group or sulfone group, or by including oxygen or nitrogen. Depending upon position of iodine atoms in iodinated aryl compounds, different isomers are classified, and the preferable examples of these isomers are compounds such as p-diiodobenzene (pDIB), 2,6-diiodo naphthalene, and p,p'-diiodobiphenyl, where iodine atoms exist symmetrically at both ends of the aryl compounds.

The amount of iodinated aryl compound is 500 to 10,000 parts by weight based on 100 parts by weight of sulfur. The amount is determined in consideration of generation of disulfide bonds.

The sulfur-containing polymerization terminator is contained in an amount of 0.03 to 30 parts by weight based on 100 parts by weight of sulfur. That is, the amount is preferably determined to achieve the minimal thermal property of PAS resin and improved luminosity with a reasonable cost.

The polymerization terminator contains an atomic group of nitrogen-carbon-sulfur in order. Preferably, the exemplary polymerization terminator is at least one selected from the group consisting of a monoiodoaryl compound, benzothiazole, benzothiazolesulfenamide, thiuram, and dithiocarbamate.

More preferably, the polymerization terminator is at least one selected from the group consisting of 2-mercaptobenzothiazole, 2,2'-dithiobisbenzothiazole, N-cyclohexylbenzothiazole-2-sulfenamide, 2-morpholinothiobenzothiazole, N-dicyclohexylbenzothiazole-2-sulfenamide, tetramethylthiuram monosulfide, tetramethylthiuram disulfide, zinc dimethyldithiocarbamate, and zinc diethyldithiocarbamate.

The composition further includes nitro compounds as a polymerization catalyst. The present inventors found that the nitro compounds were a main cause of darkening the color of PAS resin, and that even though the nitro compounds were used in a much lesser amount, an equal or better thermal property and improved luminosity were achieved by using the sulfur-containing polymerization terminator.

The polymerization catalyst can generally be any nitrobenzene derivatives. Preferably, a polymerization catalyst selected from the group consisting of 1,3-diiodo-4-nitrobenzene (mDINB), 1-iodo-4-nitrobenzene, 2,6-diiodo-4-nitrophenol, and 2,6-diiodo-4-nitrobenzene is used.

The polymerization catalyst is contained at 0.01 to 20 parts by weight with respect to 100 parts by weight of the solid sulfur, in consideration of an extent of improvement in polymerization reaction, and cost.

The composition in step a) is heated to melt all components, and mixed homogeneously.

In the following step, the method includes step b) of polymerizing the molten mixture of step a).

The reaction conditions of the polymerization are not particularly limited because they depend on reactor structure and productivity, and are known to a skilled person in the art. The reaction conditions can be selected by a skilled person in the art in consideration of the process conditions.

The polymerization of the molten mixture of step a) is performed for 1 to 30 hours while increasing the temperature and decreasing the pressure from initial reaction conditions of a temperature 180 to 250° C. and a pressure 50 to 450 Torr to final reaction conditions of a temperature 270 to 350° C. and a pressure 0.001 to 20 Torr. Preferably, the initial reaction conditions are set to a temperature of 180° C. or higher and a pressure of 450 Torr or lower in consideration of the reaction rate, and the final reaction conditions are set to a temperature of 350° C. or lower and a pressure of 20 Torr or lower in consideration of the pyrolsis of the polymer.

Because the PAS resin is prepared from the composition, it has better thermal properties and luminosity defined by the CIE Lab color model. In other words, the PAS resin has a melting temperature (Tm) of 255 to 285° C. and luminosity of 40 or higher as defined by the CIE Lab color model, and more preferably a melting temperature (Tm) of 260 to 283° C. and luminosity of 40 to 70. The luminosity was calculated according to the Hunter L,a,b on the basis of color defined by the International Commission on Illumination (CIE) as an international standard, and the definition and provision are specifically described in items E 308 and E 1347 of ASTM.

In a still further embodiment, the present invention provides a resin article manufactured from the polyarylene sulfide resin, where the article is a molded article, a film, a sheet, or a fiber.

The article is manufactured with a mixture of i) 30 to 99.9 wt % of the polyarylene sulfide resin, and ii) 0.1 to 70 wt % of a polyarylene sulfide resin synthesized from a metal sulfide and a dichlorinated aryl compound according to the Macullum process. In addition, the article is manufactured with a mixture of i) 30 to 99.9 wt % of the polyarylene sulfide resin, and ii) 0.1 to 70 wt % of a polyarylene sulfide resin that is synthesized from sulfur and an iodinated aryl compound and has a melting temperature (Tm) of 200 to less than 255° C., and luminosity of lower than 40 as defined by the CIE Lab color model.

The article can be a molded article manufactured by injection molding, extrusion molding, and other molding process. The molded articles include injection molded articles, extrusion molded articles, or blowing molded articles. In the injection molding process, the temperature of the mold is 30° C. or higher, more preferably 60° C. or higher, and most preferably 80° C. or higher in a crystallization aspect, and in terms of deformation of a test piece, the temperature is 150° C. or lower, more preferably 140° C. or lower, and most preferably 130° C. or lower. The article can be applied to parts of electrical and electronic systems, architecture, automobiles, machines, and articles for daily use.

The films or sheets are undrawn films or sheets, monoaxially-oriented films or sheet, and biaxially-oriented films or sheets. The fibers are undrawn fiber, drawn fiber, super-drawn fiber, etc., and can be used for woven fabrics, knitted fabrics, non-woven fabrics such as spun-bond, melt-blow, and staple, rope, and net.

The PAS resin of the present invention is further processed by blending with the PAS resin produced according to the Macullum process to adopt the rapid crystallization property. Alternatively, the PAS resin of the present invention is further processed by blending with a PAS resin synthesized from iodine compounds according to preparation methods other than the present invention, thereby adopting the advantages of rapid crystallization and high luminosity of the PAS resin of the present invention.

The present invention is further explained in more detail with reference to the following examples. These examples, however, should not be interpreted as limiting the scope of the present invention in any manner.

A. Preparation of Polyarylene Sulfide Resin Without a Polymerization Catalyst

COMPARATIVE EXAMPLE 1

A mixture of 300.0 g of p-diiodobenzene (pDIB), and 29.15 g of solid sulfur was melted at 180° C.

The molten mixture was polymerized for 8 hours in total to produce PAS resin as follows: at 220° C. and 350 Torr for 1 hour; at 230° C. and 200 Torr for 2 hours; at 250° C. and 120 Torr for 1 hour; at 60 Torr for 1 hour; at 280° C. for 1 hour; at 10 Torr for 1 hour; and at 300° C. and 1 Torr or lower for 1 hour.

EXAMPLE 1

PAS resin was produced by substantially the same method of Comparative Example 1, except that 0.96 g of zinc diethyldithiocarbamate (ZDEC) as a polymerization terminator was added to the mixture to be polymerized.

EXAMPLE 2

PAS resin was produced by substantially the same method of Comparative Example 1, except that 0.88 g of 2,2'-dithiobisbenzothiazole (MBTS) as a polymerization terminator was added to the mixture to be polymerized.

EXAMPLE 3

PAS resin was produced by substantially the same method of Comparative Example 1, except that 1.10 g of MBTS as a polymerization terminator was added to the mixture to be polymerized.

TEST EXAMPLE 1

The melting temperature (Tm) and luminosity (Col-L) of PAS resin obtained by Comparative Example 1 and Examples 1 to 3 were measured and are shown in Table 1.

The melting temperature was measured with a Differential Scanning calorimeter (DSC), and color analysis was performed by granulating the obtained polymer and test piece with a size of about 100 ea/g, crystallizing at 170° C. for 1 hour, and measuring luminosity defined by the CIE Lab color model with a colorimeter. The luminosity was calculated according to a Hunter L,a,b on the basis of color defined by the International Commission on Illumination (CIE) as an international standard, and the definition and provision are specifically described in items E 308 and E 1347 of ASTM.

TABLE 1

| Classification | Polymerization terminator (g) | Polymerization catalyst | Tm(° C.) | Luminosity (Col-L) |
|---|---|---|---|---|
| Comparative Example 1 | — | — | 230.1 | 66.7 |
| Example 1 | ZDEC 0.96 g | — | 235.4 | 46.7 |
| Example 2 | MBTS 0.88 g | — | 248.5 | 49.0 |
| Example 3 | MBTS 1.10 g | — | 255.8 | 48.1 |

*note:
ZDEC is zinc diethyldithiocarbamate and MBTS is 2,2'-dithiobisbenzothiazole.

As shown in Table 1, Examples 1 to 3 that further included the sulfur-containing polymerization terminator showed improved melting temperatures compared to that of Comparative Example 1.

B. Preparation of Polyarylene Sulfide Resin With a Polymerization Catalyst

COMPARATIVE EXAMPLES 2 AND 3

PAS resin was produced by the substantially the same method of Comparative Example 1, except that 0.30 g and 1.20 g of 1,3-diiodo-4-nitrobenzene (mDINB) as a polymerization catalyst were added to the mixture to be polymerized, respectively.

EXAMPLES 4 TO 7

PAS resin was produced by substantially the same method of Comparative Example 1, except that 0.30 g of 1,3-diiodo-4-nitrobenzene (mDINB) as a polymerization catalyst and MBTS as a sulfur-containing polymerization terminator were added to the mixture to be polymerized in an amount of Table 1.

TEST EXAMPLE 2

According to substantially the same method of Test Example 1, the melting temperature (Tm) and luminosity (Col-L) of PAS resin obtained by Comparative Examples 2 and 3 and Examples 4 to 7 were measured and are shown in Table 2.

TABLE 2

| Classification | Polymerization terminator (g) | Polymerization catalyst | Tm(° C.) | Luminosity (Col-L) |
|---|---|---|---|---|
| Comparative Example 2 | — | mDINB 0.30 g | 254.6 | 47.9 |
| Example 4 | MBTS 0.88 g | mDINB 0.30 g | 265.7 | 48.3 |
| Example 5 | MBTS 1.10 g | mDINB 0.30 g | 266.8 | 48.9 |
| Example 6 | MBTS 2.0 g | mDINB 0.30 g | 269.3 | 48.2 |
| Example 7 | MBTS 4.0 g | mDINB 0.30 g | 271.7 | 48.1 |
| Comparative Example 3 | — | mDINB 1.20 g | 268.5 | 31.3 |

*Note:
ZDEC is Zinc diethyldithiocarbamate, MBTS is 2,2'-dithiobisbenzothiazole, and mDINB is, 3-diiodo-4-nitrobenzene.

As shown in Table 2, the polymer obtained from Examples 4 to 7 showed an improvement in the melting temperature and luminosity.

On the other hand, the polymer of Comparative Example 1 had better luminosity than that of Comparative Example 2 with the addition of the polymerization catalyst. From the result of Comparative Example 3, as an amount of the polymerization catalyst increased, the melting temperature increased but luminosity deteriorated.

C. Production of Injection Molded Product

EXAMPLE 8

A test piece was produced from 3 kg of PAS resin of Example 7 with a catapult (ENGEL ES75P), and a tensile property test was carried out according to ASTM D638. In the process, the barrel temperature was 270° C., 300° C., and 300° C. in order from feed opening, and the nozzle temperature was 310° C.

As a result, tensile strength was 12,000 psi, tensile modules were 810,000 psi, and elongation at break was 1.4%, which satisfied the properties of PAS resin.

COMPARATIVE EXAMPLE 4

A test piece was produced from 3 kg of PAS resin of Comparative Example 2 according to substantially the same method as Example 8.

COMPARATIVE EXAMPLE 5

According to substantially the same method as Example 8, a test piece was produced from 3 kg of Ryton resin (Chevron-Philips) that was commercially available, and a representative PPS obtained by the Macullum process.

EXAMPLE 9

According to substantially the same method as Example 8, a test piece was produced from a dry-blend of 2.85 kg of the PAS resin of Example 7 and 0.15 kg of the PAS resin of Comparative Example 2.

EXAMPLE 10

According to substantially the same method as Example 8, a test piece was produced from a dry-blend of 2.7 kg of the PAS resin of Example 7 and 0.3 kg of the PAS resin of Comparative Example 2.

EXAMPLE 11

According to substantially the same method as Example 8, a test piece was produced from a dry-blend of 1.5 kg of the PAS resin of Example 7 and 1.5 kg of the PAS resin of Comparative Example 3.

EXAMPLE 12

According to substantially the same method as Example 8, a test piece was produced from a dry-blend of 2.85 kg of the PAS resin of Example 7 and 0.15 kg of the Ryton resin of Comparative Example 5.

EXAMPLE 13

According to substantially the same method as Example 8, a test piece was produced from a dry-blend of 2.7 kg of the PAS resin of Example 6 and 0.3 kg of the Ryton resin of Comparative Example 5.

TEST EXAMPLE 3

According to substantially the same method as Test Example 1, the melting temperature (Tm) and luminosity (Col-L) of PAS test pieces obtained by Comparative Examples 4 to 6 and Examples 8-13 were measured and are shown in Table 3.

TABLE 3

| Classification | Tm(° C.) | Col-L |
|---|---|---|
| Example 8 | 271.9 | 47.6 |
| Comparative Example 4 | 254.2 | 47.1 |
| Comparative Example 5 | 277.1 | 32.4 |
| Example 9 | 270.1 | 47.3 |
| Example 10 | 269.8 | 47.4 |
| Example 11 | 264.0 | 47.3 |
| Example 12 | 276.8 | 47.0 |
| Example 13 | 277.0 | 46.2 |

When the injection molded articles of Example 8 and Comparative Examples 4 to 5 were compared with the injection molded articles of Examples 9 to 11 and Examples 12 and 13 starting from the dry-blend, the articles of Examples 9 to 11 showed improved melting temperature of Example 7, and the articles of Examples 12 and 13 represented a very high crystallite rate, and luminosity.

As described above, the PAS resin is prepared from a composition including a sulfur-containing polymerization terminator and thus has excellent thermal properties and luminosity.

The invention claimed is:

1. A process of a polyarylene sulfide comprising the steps of:
   a) melting and mixing a composition comprising 100 part by weight of solid sulfur, 500 to 10,000 parts by weight of iodinated aryl compounds, and 0.03 to 30 parts by weight of a sulfur-containing polymerization terminator with respect to 100 parts by weight of the solid sulfur; and
   b) polymerizing the molten mixture of step a) for 1 to 30 hours while increasing the temperature and decreasing the pressure from initial reaction conditions of a temperature 180 to 250° C. and a pressure 50 to 450 Torr to final reaction conditions of a temperature 270 to 350° C. and a pressure 0.001 to 20 Torr, wherein the sulfur-containing polymerization terminator is at least one selected from the group consisting of, benzothiazole-sulfenamide, and dithiocarbamate, the benzothiazole-sulfenamide is at least one selected from the group consisting of N-cyclohexylbenzothiazole-2-sulfenamide,2-morpholinothiobenzothiazole, and N-N-dicyclohexylbenzothiazole-2-sulfenamide, and the dithiocarbamate is at least one selected from the group consisting of zinc dimethyldithiocarbamate and zinc diethyldithiocarbamate.

2. The process of a polyarylene sulfide according claim 1, wherein the composition further comprises at least a polymerization catalyst selected from the group consisting of 1,3-diiodo-4-nitrobenzene (mDINB), 1-iodo-4-nitrobenzene, 2,6-diiodo-4-nitrophenol, and 2,6-diiodo-4-nitrobenzene in a amount of 0.01 to 20 parts by weight based on 100 parts by weight of the solid sulfur.

* * * * *